Aug. 18, 1964  G. COURTOIS ETAL  3,145,181

RADIOACTIVE SOURCES

Filed March 14, 1961

3,145,181
RADIOACTIVE SOURCES
Guy Courtois and Pierre Le Clerc, Paris, France, assignors to Commissariat a l'Energie Atomique, Paris, France, an organization of France
Filed Mar. 14, 1961, Ser. No. 95,700
Claims priority, application France Mar. 17, 1960
3 Claims. (Cl. 252—301.1)

The present invention relates to radioactive sources (that is to say to elements containing at least one radioactive substance emitting alpha, beta and/or gamma rays) intended to be used for industrial purposes such as measurement of wear, measurement of velocity of displacement or of thickness, testing and/or check-up operations. The invention is more particularly but not exclusively concerned with radioactive sources intended to be used under high mechanical stresses in corrosive mediums and or at high temperatures.

The object of this invention is to provide a raidoactive source which is better adapted to meet the requirements of practice than those known up to the present time, especially concerning on the one hand resistance to mechanical stresses, to corrosion and/or to high temperatures and on the other hand absence of contamination of the surrounding medium due to leakage or diffusion of the radioactive substance of the source.

According to an essential feature of the present invention, the radioactive source comprises a mass of the surrounding material called "pyroceram" having a composition analogous to that of a titanium glass, but in the crystallized state, and a radioactive substance embedded or incorporated in said mass of pyroceram.

Pyroceram is advantageously free from potassium and sodium. Furthermore, this mass of ceramic material is preferably enclosed in a resistant container of stainless steel, disposed in an envelope of sintered alumina.

Figure 1:
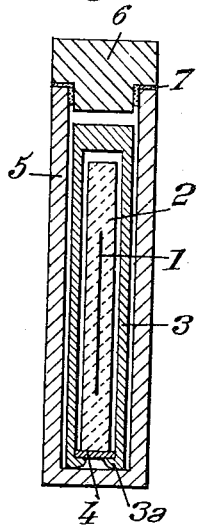
Figure 2:
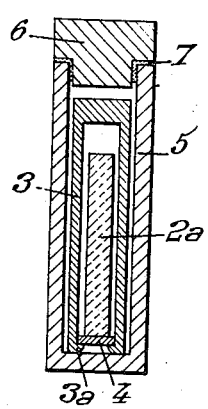
Figure 3:
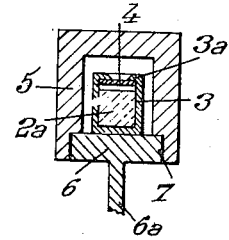

Preferred embodiments of the present invention will be hereinafter described with reference to the accompanying drawings, given merely by way of example and in which:

FIGS. 1, 2 and 3 are sectional views of three respective embodiments of radioactive sources according to the present invention.

Figure 4:
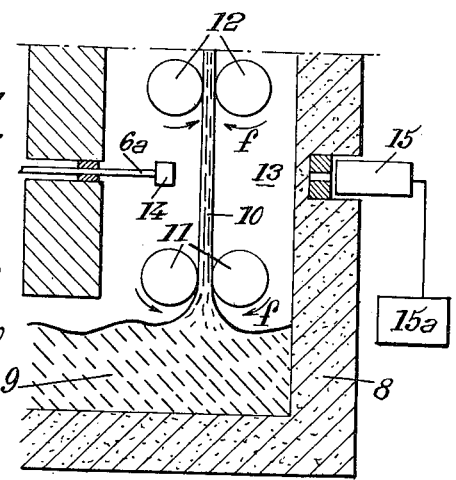

FIG. 4 diagrammatically shows a system for checking up the thickness of a glass sheet during the manufacture thereof, this system making use of a radioactive source of the type shown by FIG. 3.

Figure 5:
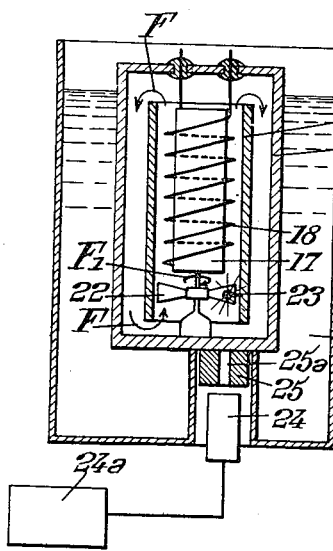

FIG. 5 illustrates the application of a source according to the invention to the measurement of a gaseous convection stream.

According to the present invention, a radioactive substance 1 (cobalt 60, antimony 124, tantalum 182 and so on) is either embedded (FIG. 1) or incorporated (FIGS. 2 and 3) in a mass of special ceramic material 2 or 2a, consisting of a composition of matter analogous to that of titanium glass but in the crystallized state. This material is of the type described in the French Patent No. 1,177,799, filed on May 28, 1957 (corresponding to U.S. Patent No. 2,920,971 to Stanley D. Stookey, issued January 12, 1960, and it is usually called "pyroceram," being advantageously free from potassium and sodium. Preferably, as shown, this mass of ceramic material is housed in a stainless steel container, consisting of a tube 3 closed by a plate 4 the whole being disposed in a sintered alumina envelope consisting of cylinder 5 closed by a plug 6.

In the embodiment of the invention illustrated by FIG. 1, the radioactive source comprises a wire 1 of cobalt embedded in a cylinder 2 of pyroceram material having the following composition by weight:

| | Percent |
|---|---|
| $SiO_2$ | 43.5 |
| $Al_2O_3$ | 17.5 |
| $TiO_2$ | 8.7 |
| $ZnO$ | 26.1 |
| $MgO$ | 4.3 | this material having a crystallization temperature of 1,220° C. and remaining in the crystallized state up to 1,375° C. (this material having the composition of Example 36 of the above mentioned French patent).

Cylinder 2 is enclosed in a tube 3 made of stainless steel having for instance the following composition:

| | |
|---|---|
| Ni | 7–8%. |
| Cr | 16–20%. |
| C | 0.1–0.2%. |
| Fe | Necessary amount to reach 100%. | this cylinder being closed by a plate 4 also made of stainless steel and fixed by setting of the edge 3a of tube 3.

Tube 3 is in turn housed in a container 5 made of sintered alumina, closed by a plug 6 also made of sintered alumina and sealed at 7 on container 5 by diffusion at 1,100° C. of a special glass of the type commonly called "Series E glass" manufactured and sold by Société Anonyme des Manufactures des Glaces et Produits Chimiques de Saint-Gobain, Chauny & Cirey, that is to say a fibre glass having a melting point higher than that of ordinary glasses, little alterable and containing a high proportion of beryllium oxide and chiefly of alumina, whereas it contains but a small amount of alkaline oxide. A Series E glass generally contains more than 50% of silica and more than 30% of alumina+lime.

Sealing by means of Series E glass is advantageously performed as follows.

A suspension of a powder of such a glass in a very pure oil capable of burning or evaporating completely is prepared to form a thick paste. This paste is applied to form a seal at 7 between plug 6 and container 5 and the tube and, in particular, the paste are heated to a temperature of 1,100° C. for a time ranging from 7 to 10 minutes. The boiling oil heats the surrounding alumina and produces a self-diffusion thereof to form a joint of excellent quality. It should be noted that heating at 1,100° C. for a time shorter than 7 minutes involves risks of obtaining a seal of insufficient quality.

The dimensions of the different elements of the source according to FIG. 1 may be as follows (in millimeters):

| | |
|---|---|
| Length of wire 1 | 20 |
| Diameter of wire 1 | 1 |
| Length of cylinder 2 | 30 |
| Diameter of cylinder 2 | 4 |
| Length of tube 3 | 40 |
| External diameter of tube 3 | 7.8 |
| Width of container 5 with plug 6 in position | 52 |
| Diameter of container 5 | 12 |

In a modification, the seal between plug 6 and container 5 may be formed, instead of Series E glass, of a pyroceram having the following composition:

| | Percent |
|---|---|
| $SiO_2$ | 40.9 |
| $Al_2O_3$ | 25.4 |
| $TiO_2$ | 9.1 |
| $CoO$ | 24.6 | and having a temperature of crystallization of 1,250° C., this product remaining in the crystallized state up to 1,350° C., that is to say higher than the corresponding temperature of the pyroceram used for making cylinder 2. It then suffices to heat the whole of the source at a temperature which is kept exactly constant and slightly lower than the melting temperature of the pyroceram of cylinder 2, for instance 1,200–1,300° C., so that this pyroceram remains in the crystallized state. Anyway, the sealing should be performed at the highest temperature possible while maintaining the pyroceram of cylinder 2 in the crystallized state, because self-diffusion of sintered alumina increases with the temperature.

As for the irradiation of the cobalt wire, it is performed for instance in a nuclear reactor where cobalt 59 is transformed into cobalt 60 (which emits beta and gamma rays) under the effect of the neutron flux existing in the reactor, but this operation is effected before tube 3 is enclosed in container 5.

The source of FIG. 2 is similar to that of FIG. 1 but the radioactive substance is integrated in cylinder 2a, made of pyroceram having the following composition already mentioned:

| | Percent |
|---|---|
| $SiO_2$ | 40.9 |
| $Al_2O_3$ | 25.4 |
| $TiO_2$ | 9.1 |
| $CoO$ | 24.6 |

This pyroceram is that given in Example 94 in the above mentioned French patent. The cobalt 59 entering in the composition of the pyroceram is transformed, by neutron irradiation in a nuclear reactor, into radioactive cobalt 60, irradiation preferably taking place, as for the source of FIG. 1, when the pyroceram cylinder is enclosed in the stainless steel tube 3.

It will be noted that the pyroceram compositions used according to the present invention contain neither potassium nor sodium because these two alkaline elements would be strongly activated during the presence of the pyroceram in the nuclear reactor necessary for activating cobalt 59 into cobalt 60.

The dimensions of the source of FIG. 2 may be as follows (in millimeters):

| | |
|---|---|
| Length of cylinder 2a | 20 |
| Diameter of cylinder 2a | 3.2 |
| External height of tube 3 | 30 |
| External diameter of tube 3 | 8 |
| Length of container 5 with its plug 6 | 42 |
| External diameter of container 5 | 12 |

The sources according to FIGS. 1 and 2 are suitable for various determinations in corrosive mediums at high temperatures and in particular for measuring the wear of the refractory linings of blast furnaces.

For instance, when a blast furnace is being restored, some bricks may be hollowed out by means of a carborundum tool so as to form holes of a depth of about 10 mm. and of a diameter ranging from 9 to 15 mm. About one hundred of such holes may thus be formed at various levels of the blast furnace and a source (of an intensity ranging from one to some millicuries) made according to FIG. 1 or FIG. 2 is inserted in each of these holes which are subsequently packed with a mixture of carbon and a refractory cement. The other layers of the refractory material are made normally.

A source according to FIG. 1 or 2 is sufficiently powerful to be detected from the outside of the blast furnace by means of a portable radiation detector, for instance a Geiger-Müller counter or a scintillation counter for refractory linings of a thickness of 70 cm. (for instance silico-aluminous linings).

The wear of the refractory lining is determined by observing, by means of the detector, the disappearance of the source, which takes place at the same time as the brick in which said source is housed itself disappears. A source of 6 millicuries can still be detected through a thickness of 75 cms. of refractory material. The source is dissolved partly in cast iron (tube 3 and plate 4 made of stainless steel) and partly in the slag (pyroceram and alumina).

The advantages of a source according to the invention when it is desired to determine the wear of a blast furnace refractory lining are defined as follows:

The source can resist to the high temperature existing in the blast furnace;

It is capable of resisting to the high mechanical stresses resulting from the distortion undergone by the brick in which the source is housed;

The radioactive substance contained in the source does not diffuse into the surrounding bricks, which permits an easy detection.

In this application, the wire of cobalt 60 of the source of FIG. 1 may be replaced by a wire of tantalum 182 or by a wire of antimony 124.

FIG. 3 shows a source similar to that of FIG. 2 (the same reference numerals are being used for FIGS. 2 and 3) but of different dimensions and comprising a supporting rod 6a carried by a plug 6. The dimensions of the source of FIG. 3 are as follows:

| | |
|---|---|
| Length of cylinder 2a | 6 |
| Diameter of cylinder 2a | 6 |
| Length of tube 3 | 8 |
| Diameter of tube 3 | 8 |
| Length of container 5 | 20 |
| Diameter of container 5 | 18 |
| Diameter of rod 6a | 2 |

The source of FIG. 3 is well adapted for determining the thickness of a glass sheet as it leaves the furnace in which it has been manufactured so as to obtain an automatic regulation of the thickness of this sheet.

Such a device is shown by FIG. 4. This figure represents the end of a tank 8 containing the mass of glass 9 from which a sheet 10 is drawn by means of rollers 11 and 12 rotating in the direction of arrows $f$. Glass sheet 10, as it is being formed, is at a temperature ranging from 1,100 to 1,600° C. and is in an atmosphere 13 containing corrosive gases the temperature of which ranges from 1,200 to 1300° C.

The source 14 made according to the embodiment of FIG. 3, carried by its rod 6a, is capable of resisting this high temperature and this corrosive atmosphere and it permits, in cooperation with the radiation detector 15 (of the Geiger-Müller or scintillation type), which is connected to an electronic unit 15a of any type known in the art, of determining the thickness of sheet 10 just as it is being formed. It is thus possible to control without any delay the correct speed of rotation of rollers 11 and 12 in case of variation of the thickness of the sheet. It is thus possible to prevent a waste of glass which would be unavoidable if the thickness of the sheet were measured at a greater distance from the bath of molten glass.

Another application of a radioactive source according to the present invention is illustrated by FIG. 5. This figure relates to the measurement of the velocity of convection gases in a closed vessel heated at high temperature, for instance to determine the action of carbonic acid gas on graphite at very high temperature (in particular in a graphite moderated heterogeneous nuclear reactor cooled by means of carbonic acid gas).

For this purpose, a graphite block 17 heated at 1,100°

C. by means of a resistor 18 fed from any suitable source of current is enclosed in a container 16.

Container 16 is placed in a vessel 19 through which a stream of water 20 is circulating. The circulation of carbonic acid gas present in container 16 takes place along the arrows F around cylinder 21 acting as a baffle. The velocity of the carbonic acid gas convection stream is determined by placing a small element 22 analogous to a wind-mill and rotatable about a vertical axis. The gas stream causes this element to rotate in the direction of arrow $F_1$. A source 23 according to the invention is placed on one of the plates of this element 22. This source cooperates with a radioactive detector 24 the pulses of which are counted by an electronic system 24a of a suitable type, collimating means 25 being provided in front of detector 24 so that source 23 influences the detector only when it is located opposite the passage 25a provided in said collimating means 25. Thus the number of revolutions per minute of element 22 and therefore the velocity of the convection stream is easily determined.

A radioactive source according to the invention may have many applications. For instance, such a source permits of following the path of travel of a brick of zinc ore in a vertical zinc furnace of the type known as "New-Jersey" furnace, which permits of determining the average time for which such a brick remains in the furnace and also the instantaneous speed of the brick at different points.

For this purpose, a radioactive source according to the invention is placed at the center of the brick and the travel of said brick is followed by means of a radiation detector placed inside the furnace, this being possible due to the fact that the source according to the invention is capable of resisting temperatures as high as 1,200° C. and the highly corrosive atmosphere (of volatile chlorides in particular) existing inside the furnace.

A source according to the invention has the following advantages:

First, it is capable of resisting high mechanical stresses since it is housed in a stainless steel tube;

It can resist high temperatures and corrosive atmospheres, owing to the fact that it is embedded or disposed in a mass of pyroceram, which has a high chemical inertia, even at high temperatures, and a very high melting point (from 1,200 to 1,500° C.), this mass remaining in its solid state up to its melting point in opposition with what takes place with a glass composition;

The radioactive substance does not diffuse to the outside of the source proper, due to the fact that pyroceram is not porous and that the sintered alumina envelope has a tight seal 7.

It will be noted that in a radioactive source according to the invention, the radioactive substance is embedded or incorporated in a pyroceram, that is to say a crystallized substance, which clearly differentiates such a source from sources comprising a radioactive substance enclosed in a glass envelope, that is to say in an amorphous non crystallized substance. The high resistance of sources according to the invention from the mechanical, chemical and thermal points of view (in particular resistance to thermal shocks) makes these sources especially suitable for the above indicated purposes.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A radioactive source resisting to mechanical, thermal and chemical severe conditions, constituted by a devitrified glass comprising essentially silica, alumina, titania and cobalt oxide, but devoid of potassium and sodium, at least part of the cobalt atoms in said cobalt oxide being radioactive cobalt-60 atoms.

2. A radioactive source resisting to mechanical, thermal and chemical severe conditions, constituted by a devitrified glass comprising about 40 parts by weight of $SiO_2$, about 25 parts by weight of $Al_2O_3$, about 10 parts by weight of $TiO_2$ and about 25 parts by weight of CoO, at least part of the cobalt atoms in said CoO being radioactive cobalt-60 atoms.

3. A radioactive source resisting to mechanical, thermal and chemical severe conditions, constituted by a mass of devitrified glass, comprising essentially silica, alumina, titania and cobalt oxide, but devoid of potassium and sodium, at least part of the cobalt atoms in said cobalt oxide being radioactive cobalt-60 atoms, a stainless steel container enclosing said mass, a sintered alumina envelope closely surrounding almost completely said container and a sintered alumina plug sealed on said envelope by diffusion at high temperature of a glass having a high silica content and a high melting point, said envelope closed by said plug surrounding completely said container.

References Cited in the file of this patent

UNITED STATES PATENTS

| | | |
|---|---|---|
| 2,182,087 | Leverenz | Dec. 5, 1939 |
| 2,255,109 | Fischer | Sept. 9, 1941 |
| 2,830,190 | Karp | Apr. 8, 1958 |
| 2,891,168 | Goertz et al. | June 16, 1959 |
| 2,928,780 | Harteck et al. | Mar. 5, 1960 |
| 2,964,628 | Ohmart | Dec. 13, 1960 |

OTHER REFERENCES

Goldman: "2nd Geneva Conference, Peaceful Uses of Atomic Energy," vol. 18, pp. 27–32, September 1958.

Thomas: "2nd Geneva Conference, Peaceful Uses of Atomic Energy," vol. 18, pp. 37–38, September 1958.

C. & E. News, Oct. 3, 1960, pp. 20, 21.